United States Patent [19]

Hibi

[11] Patent Number: 5,859,665
[45] Date of Patent: Jan. 12, 1999

[54] IMAGE STABILIZING DEVICE HAVING A LOCKING ELEMENT FOR LOCKING WHEN REMOVED FROM A LENS

[75] Inventor: Tetsushi Hibi, Kawasaki, Japan

[73] Assignee: Canon Kabushiki Kaisha, Tokyo, Japan

[21] Appl. No.: 520,674

[22] Filed: Aug. 29, 1995

[30] Foreign Application Priority Data

Aug. 31, 1994 [JP] Japan ................................. 6-229026
Aug. 31, 1994 [JP] Japan ................................. 6-229027

[51] Int. Cl.$^6$ .................................................. H04N 5/228
[52] U.S. Cl. ........................................... 348/208; 396/55
[58] Field of Search ................................. 348/207, 208, 348/373, 374, 375; 396/52, 53, 54, 55; H04N 5/228

[56] References Cited

U.S. PATENT DOCUMENTS

| | | | |
|---|---|---|---|
| 4,864,339 | 9/1989 | Gross et al. ............................. | 396/55 |
| 5,107,293 | 4/1992 | Sekine et al. ........................... | 348/208 |
| 5,117,246 | 5/1992 | Takahashi et al. ....................... | 396/55 |
| 5,175,580 | 12/1992 | Siomi ..................................... | 396/55 |
| 5,523,811 | 6/1996 | Wada et al. ............................. | 396/55 |

FOREIGN PATENT DOCUMENTS

0540046A2  5/1993  European Pat. Off. ....... H04N 5/232

*Primary Examiner*—Wendy Garber
*Assistant Examiner*—Tuan V. Ho
*Attorney, Agent, or Firm*—Fitzpatrick, Cella, Harper & Scinto

[57] ABSTRACT

An image stabilizer is provided having a pair of transparent plates enclosing a soft substance therein. The image stabilizer further includes a driving element for tilting the pair of transparent plates, and an inhibiting element for inhibiting the pair of transparent plates from being tilted in response to removing the image stabilizer from an objective lens.

4 Claims, 13 Drawing Sheets

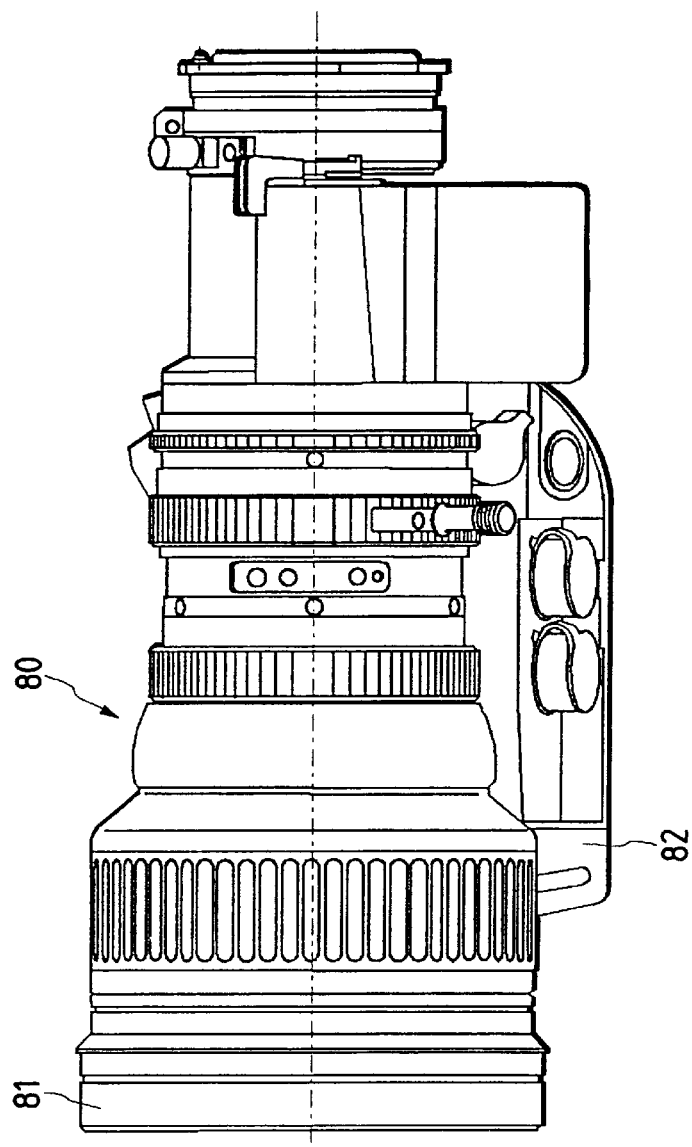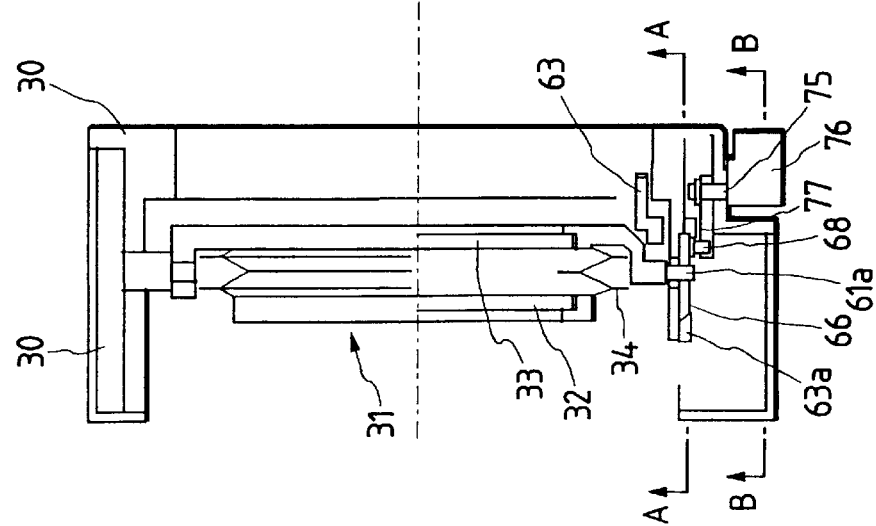

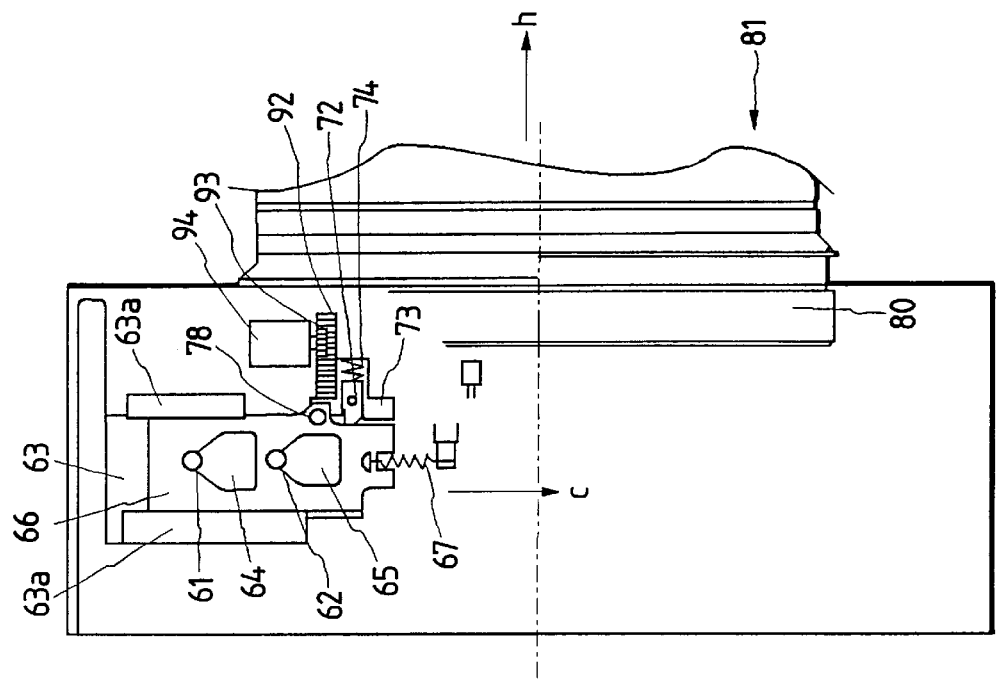
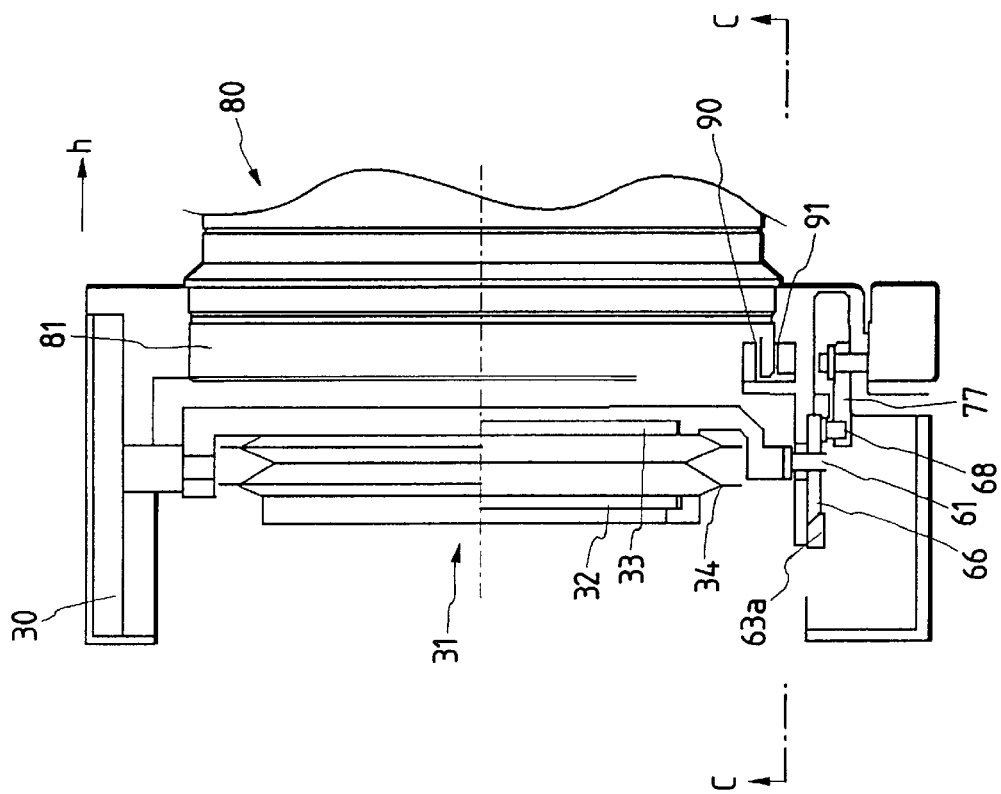

IMAGE STABILIZING DEVICE HAVING A LOCKING ELEMENT FOR LOCKING WHEN REMOVED FROM A LENS

BACKGROUND OF THE INVENTION

1. Field of the Invention

This invention relates to an image vibration correcting device used in an image pickup apparatus such as a television camera or a video camera and capable of obtaining a stable image free of image vibration when disturbance vibration is applied to the image pickup apparatus.

2. Related Background Art

In recent years, image pickup apparatus such as television cameras and video cameras have been advanced in their automatization and the technique of realizing the vibration correcting function of automatically correcting image vibration attributable to the vibration of the entire apparatus has also been put into practical use.

As vibration correcting means, there is known a variable angle prism which, as shown in FIG. 11 of the accompanying drawings, is disposed on the photo-taking optical path of a photo-taking lens and inclines the photo-taking optical path by the relative tilting of a pair of transparent plates having transparent liquid interposed therebetween to thereby correct the vibration of an image field.

That is, two transparent plates 1 and 2 each comprising a glass plate or the like have their outer peripheral frame members 3 and 4 sealed by bellows-like film 5, and this hermetically sealed space is filled with liquid of a high refractive index, and a variable angle prism 6 is constituted by these.

The frame member 3 has a flattened coil 7 secured to one end thereof, and permanent magnets 8 and yokes 9, 10 opposed to each other with the coil 7 interposed therebetween are disposed on the opposite sides of the coil 7 to thereby constitute driving means 11 comprising a closed magnetic circuit. The frame member 3 also is provided with an arm 13 having a slit 12, and a light emitting element 14 and a light receiving element 15 are disposed on the opposite sides of the arm 13 in an opposed relationship with each other, and a beam of light emitted from the light emitting element 14 may pass through the slit 12, and thereafter may be applied to the light receiving element 15. The light emitting element 14 is, for example, an infrared light emitting element emitting infrared light such as an IRED, and the light receiving element 15 is, for example, a photoelectric conversion element such as a PSD of which the output is varied by the spot position of the received beam of light.

The frame member 4 is also provided with an arm 17 having a slit 16, and, although not shown, there are disposed a flattened coil, permanent magnets, yokes, a light emitting element and a light receiving element similar to those on the frame member 3 side.

On the supporting portion of the apparatus, vibration detectors 18 and 19 as vibration detecting means are mounted with respect to the pitch direction P and the yaw direction Y so as to be capable of detecting the amounts of vibration of the entire apparatus in the pitch direction P and the yaw direction Y, and there are provided a control circuit 20 as control means comprised of an A/D converter, a D/A converter, a CPU, a memory, etc. and receiving as inputs the detection signals of the vibration detectors 18 and 19 and controlling a system, and a coil driving circuit 21 for supplying an electric current to the coil 7 on the frame member 3 side and the coil on the frame member 4 side in accordance with the command of the control circuit 20.

The frame members 3 and 4 are supported on a frame, not shown, by a pitch shaft P and a yaw shaft Y, and a lock pin 24 protruding to the outside in the direction of the pitch shaft P is secured to the outer peripheral surface of the frame member 4. A lock knob 25 formed with a V-shaped recess for receiving the lock pin 24 is provided on the frame and also, a limit switch 26 for detecting the operated position of the lock knob 25 is provided. Although not shown, a lock pin 24, a lock knob 25 and a limit switch 26 are also disposed on the frame member 3 centering around the direction of the yaw shaft Y to lock the frame member 3 in its neutral position.

In an operator's the image vibration preventing device of such a construction, when vibration is caused to the entire apparatus due to the vibration of the hands holding the entire apparatus, disturbance vibration or the like, the vibration detectors 18 and 19 detect the vibration and the signals thereof are inputted to the control circuit 20, whereby the vertical angle of the variable angle prism 6 necessary to eliminate the vibration is calculated.

On the other hand, the fluctuation of the angles of rotation of the opposed transparent plates 1 and 2 about the shafts P and Y, i.e., the vertical angles of the variable angle prism 6 in the pitch and yaw directions, causes a fluctuation to the spot position on the light receiving surface when the beam of light emitted from the light emitting element 14 is transmitted through the slits 12 and 16 formed in the arms 14 and 17 of the frame members 3 and 4 rotated with the opposed transparent plates 1 and 2 and enters the light receiving element 15. The light receiving element 15 transmits to the control circuit 20 an output conforming to the amount of movement of the spot thereon, i.e., the magnitude of the vertical angle of the variable angle prism 6. This control circuit 20 calculates the difference between the magnitude of the aforementioned calculated vertical angle and the magnitude of the vertical angle at the present point of time and transmits it to the coil driving circuit 21. This coil driving circuit 21 supplies the coil 8 with a driving current conforming to a coil driving command signal.

The variable angle prism 6 effects rotative movement about the shafts X and Y by the coil 8 and is deformed so as to coincide with the magnitude of the aforementioned calculated vertical angle. That is, the variable angle prism 6 is designed to effect the correction control of vibration by feedback control using the value of the vertical angle calculated so as to correct vibration as a reference signal and using the value of the current vertical angle as a feedback signal.

Also, when vibration correction is not effected, the lock knob 25 is moved upwardly and the lock pin 24 is held in the recess at the upper end of the lock knob 25. Thereupon, the frame member 4 becomes unable to rotate relative to the yaw shaft Y and is locked in the yaw direction. On the other hand, when the lock knob 25 is moved up to its lock position, the limit switch 26 is operated and the operation is transmitted to the coil driving circuit 21 and in conformity therewith, the supply of electric power to the coil of the frame member 4 is stopped. Although not shown in FIG. 11, the pitch direction P is likewise locked. Besides this, there is a system which, when the operation of the camera is in a standby state, electrically moves the lock knob 25 up to its lock position in response to this state and stops vibration correction.

However, for the above-described example of the conventional art to be used in the large photo-taking lens, particularly the high-magnification photo-taking lens, of a television camera or the like, the variable angle prism 6 generally disposed forwardly of the front lens portion of the high-magnification photo-taking lens need be made large when the effective beam of light of the lens is taken into consideration. Accordingly, the driving means for tilting the transparent plates 1 and 2 of the variable angle prism 6 also becomes bulky and the image vibration correcting device tends to become bulky. Further, the balkiness of the device including the photo-taking lens and an increase in the weight thereof result.

Therefore, there is not so great a problem in the photographing on a vehicle or a helicopter, while during the photographing on a shoulder, i.e., the photographing in hands, there is the disadvantage that the mobility thereof is lost.

SUMMARY OF THE INVENTION

It is a first object of the present invention to provide an image stabilizer which can improve the mobility during photographing with a camera held in an operator's hands.

It is a second object of the present invention to make the image stabilizer from an objective lens to thereby remove the image stabilizer during ordinary photographing in which the vibration prevention function is not performed, and prevent the removed device from being damaged at this time by a shock being inadvertently applied thereto from the outside.

An image stabilizer removably mountable on an objective lens and stabilizing the image of the objective lens is provided with a pair of transparent plates enclosing a soft substance therein; driving means for tilting the pair of transparent plates; and inhibiting means for inhibiting said pair of transparent plates from being tilted in response to the operation of removing the image stabilizer from the objective lens.

Further features of the present invention will become apparent from the following description.

BRIEF DESCRIPTION OF THE DRAWINGS

FIGS. 2A and 2B are side views in which a portion corresponding to a photo-taking lens is cut away.

FIG. 9 shows the construction of a second embodiment of the present invention.

FIG. 10 is a cross-sectional view taken along the line C—C of FIG. 9.

DESCRIPTION OF THE PREFERRED EMBODIMENTS

The present invention will hereinafter be described in detail with respect to some embodiments thereof shown in FIGS. 1A and 1B to FIG. 10.

Figure 1A:
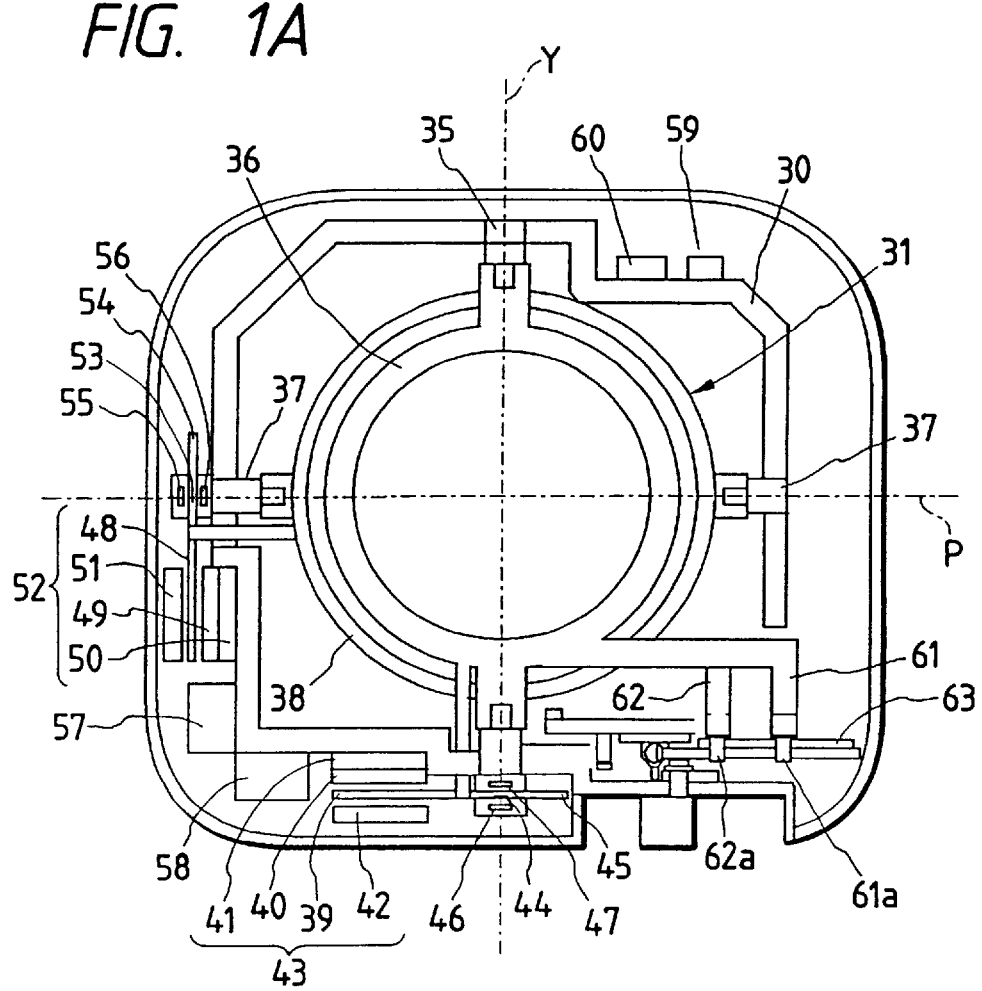
FIGS. 1A and 1B show the construction of a first embodiment of the present invention.
Figure 1B:
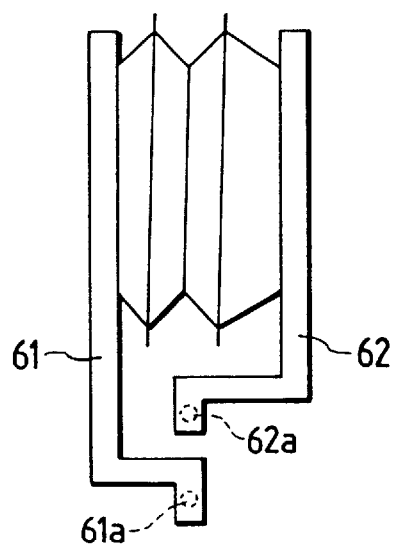

FIGS. 1A and 1B show the construction of a first embodiment. The frame 30 of a device according to this embodiment is of an open square box shape and carries a variable angle prism and electronic parts thereon. Also, it has a mounting and dismounting mechanism with respect to a photo-taking lens as will be described later.

The variable angle prism 31 is constructed such that as shown in FIGS. 2A and 2B, two circular front and back transparent plates 32 and 33 have their outer peripheries sealed by bellows-like film 34 and this hermetically sealed space is filled of liquid of a high refractive index, and the film 34 is formed into two to three steps of bellows so that the variable angle prism 31 may be inclined in any direction and have a vertical angle. As shown in FIGS. 1A and 1B, a frame member 36 is supported on a frame 30 by a diametral yaw shaft 35 provided on the outer periphery thereof, a frame member 38 is supported on the frame 30 by a diametral pitch shaft 37 provided on the outer periphery and orthogonal to the yaw shaft 35, the variable angle prism 31 has its transparent plate 32 side held by the frame member 36 and has its transparent plate 33 side held by the frame member 38, and the transparent plates 32 and 33 are rotatable about the yaw shaft 35 and the pitch shaft 37.

Also, on the frame member 36, a flattened coil 39 orthogonal to an arm portion extending in a direction parallel to the yaw shaft 35 is secured to the tip end of the arm portion, and a permanent magnet 40 and yokes 41 and 42 having their surfaces opposed to one another are disposed on the opposite sides of the coil 39, whereby driving means 43 by a closed magnetic circuit is constituted. Further, an arm 45 having a slit 44 is provided at the tip end of the arm portion on the side opposite to the flattened coil 39, and a light emitting element 46 and a light receiving element 47 are disposed in opposed relationship with each other with the arm 45 interposed therebetween.

Driving means 52 by a closed magnetic circuit provided by a coil 48, a permanent magnet 49 and yokes 50, 51 similar to those provided on the frame member 36 is constructed also on the other frame member 38, and an arm 54 having a slit 53, a light emitting element 55 and a light receiving element 56 are disposed.

On the frame 30, vibration detectors 57 and 58 as vibration detecting means with respect to a pitch direction P and a yaw direction Y are mounted so as to be capable of detecting the amounts of hand vibration of the entire apparatus in the pitch direction and the yaw direction. Also, a control circuit 59 comprised of an A/D converter, a D/A converter, a CPU, a memory, etc. and receiving as inputs the detection signals of the vibration detectors 57 and 58 and controlling a system and a coil driving circuit 60 for supplying an electric current to the coils 39 and 48 in accordance with the command of the control circuit 59 are mounted on the frame 30.

Next, it will be hereinafter explained about a mechanism for locking transparent plates of a stabilizer, namely a mechanism for forbidding removal of the transparent plates when the stabilizer is dismounted.

Figure 3:
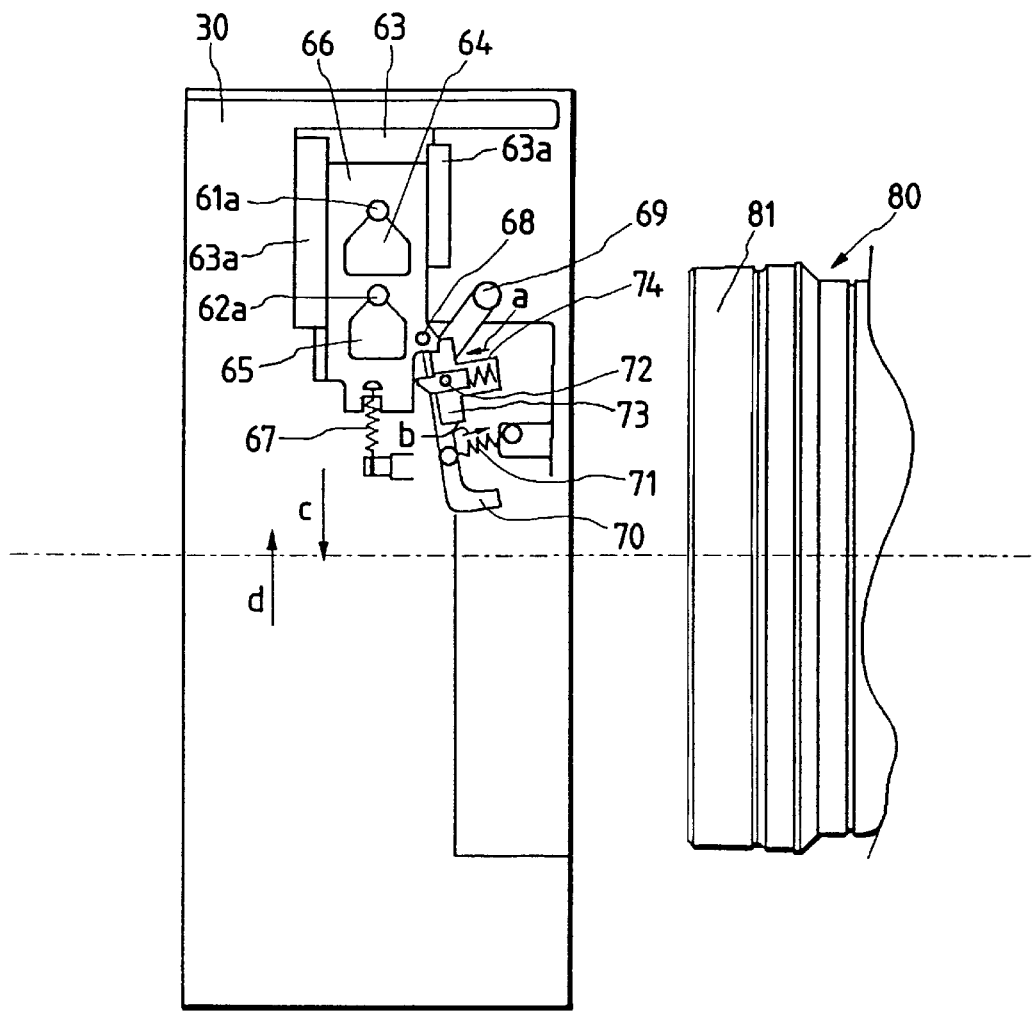
FIG. 3 is a cross-sectional view of the first embodiment before being mounted on the photo-taking lens taken along the line A—A of FIG. 2A.

Support arms 61 and 62 having their tip ends bent at a right angle and parallel to each other, as shown in FIG. 1B, are provided on the outer peripheries of the frame members 36 and 38, and lock pins 61a and 62a are attached to the tip ends thereof. Also, a support stand 63 having regulating edges 63a on the opposite sides thereof as shown in FIG. 3 is provided on the frame 30, and a lock plate 66 in which cut-out portions 64 and 65 each having a V-shaped portion in the upper portion thereof are disposed in series has its opposite sides guided by the regulating edges 63a and is supported on the support stand 63 for sliding movement in the directions of arrows c and d, and the lock pins 61a and 62a are inserted in the cut-out portions 64 and 65, respectively. This lock plate 66 is biased in the direction of arrow c by a tension spring 67 having one end thereof attached to the projection of the frame 30. A changeover pin 68 is protrudely provided in parallelism to the lock pin 62 on the right side of the lock plate 66 as viewed in FIG. 3.

On the other hand, on the frame 30, there is provided an interlocking lever 70 which extends from a shaft 69 rising in a direction parallel to the lock pin, in the direction of arrow c orthogonal to the direction of mounting with respect to a photo-taking lens, and which is pivotable about the shaft 69. This lever 70 has its bent tip end biased in the direction of arrow b which is the lens insertion side, by a tension spring 71 having one end thereof attached to the projection of the frame 30. Also, on the interlocking lever 70, a stopper 73 having a pin 72 striking in a direction orthogonal to the interlocking lever 70 is supported integrally with the interlocking lever 70, and is biased in the direction of arrow a opposite to the direction of arrow b by a push-up spring 74.

Figure 4:
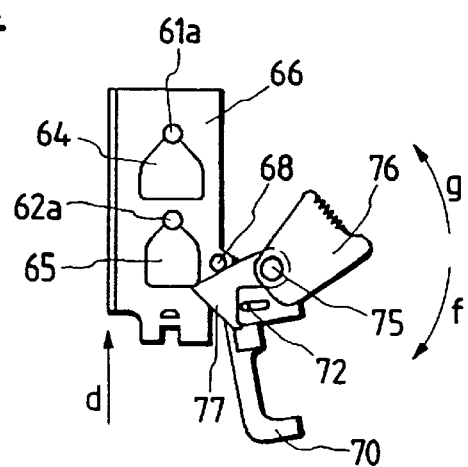
FIG. 4 is a cross-sectional view of the first embodiment before being mounted on the photo-taking lens taken along the line B—B of FIG. 2A.

Also, on this side of the stopper 73, there are provided a lock lever 76 pivotally supported on a shaft 75 provided on the frame 30 as shown in FIG. 4, and a changeover lever 77 interlocking with the lock lever 76 and bearing against the changeover pin 68.

Figure 5:
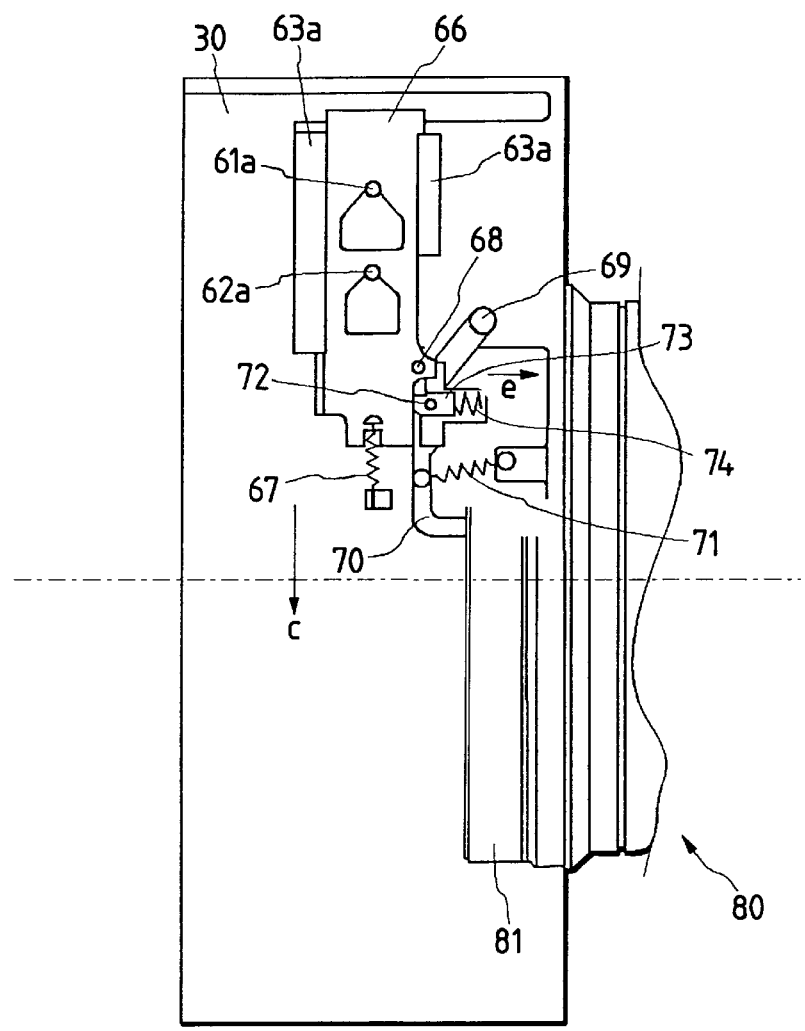
FIG. 5 is a cross-sectional view of the first embodiment when mounted on the photo-taking lens taken along the line A—A of FIG. 2A.
Figure 6:
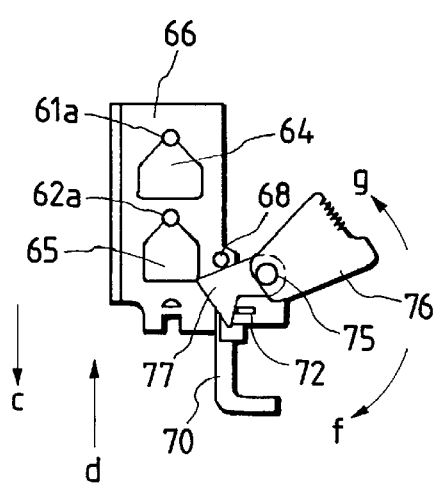
FIG. 6 is a cross-sectional view of the first embodiment when mounted on the photo-taking lens taken along the line B—B of FIG. 2A.

The image vibration correcting device thus constructed is mounted on a photo-taking lens 80 as shown in FIG. 5 when vibration correction during photographing on a vehicle or a helicopter is necessary. Thereupon the tip end of the interlocking lever 70 strikes against the fore lens barrel portion 81 of the photo-taking lens 80 and the interlocking lever 70 becomes substantially parallel to the lock plate 66. Also, the stopper 73 strikes against the lock plate 66 and is pushed in the direction of arrow e against the biasing force of the tension spring 74. On the other hand, the frame members 36 and 38 remain in a state in which the lock pins 61a and 62a are in the V-shaped portions of the lock plate 66 and rotation is restricted, that is, a state in which the driving means for correcting vibration is locked. At this time, as shown in FIG. 6, the lock lever 76 and the changeover lever 77 are not operated. Thus, in the present embodiment, the vibration correcting device, even if mounted on the photo-taking lens, has its operation inhibited unless the lock lever 76 is operated.

Figure 7:
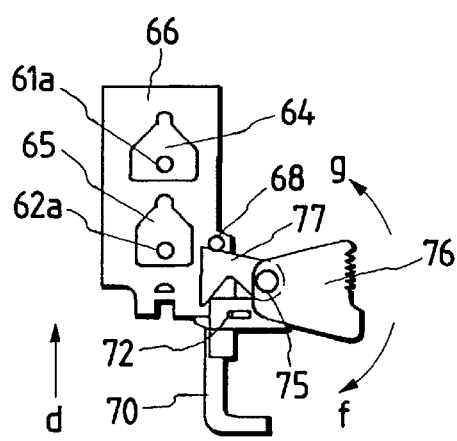
FIG. 7 is a cross-sectional view of the first embodiment when mounted on the photo-taking lens taken along the line B—B of FIG. 2A and showing a state in which a lock is released.
Figure 8:
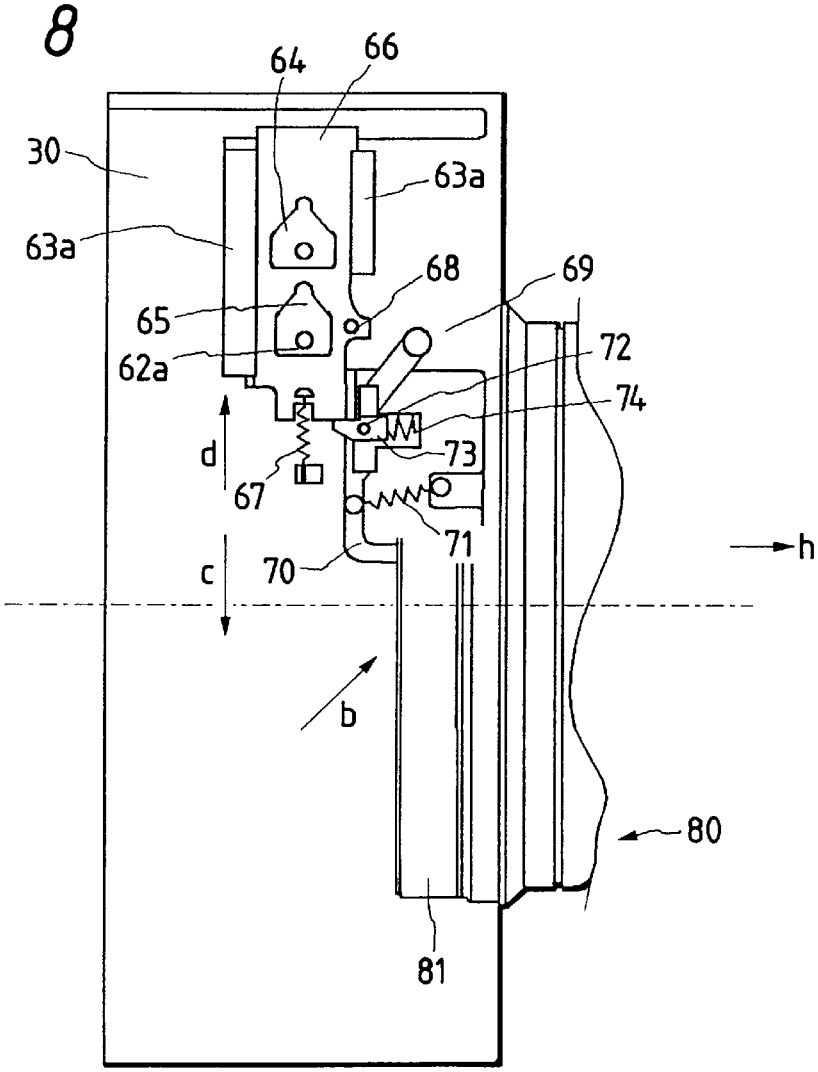
FIG. 8 is a cross-sectional view of the first embodiment when mounted on the photo-taking lens taken along the line A—A of FIG. 2A and showing the state in which the lock is released.
Figure 11:
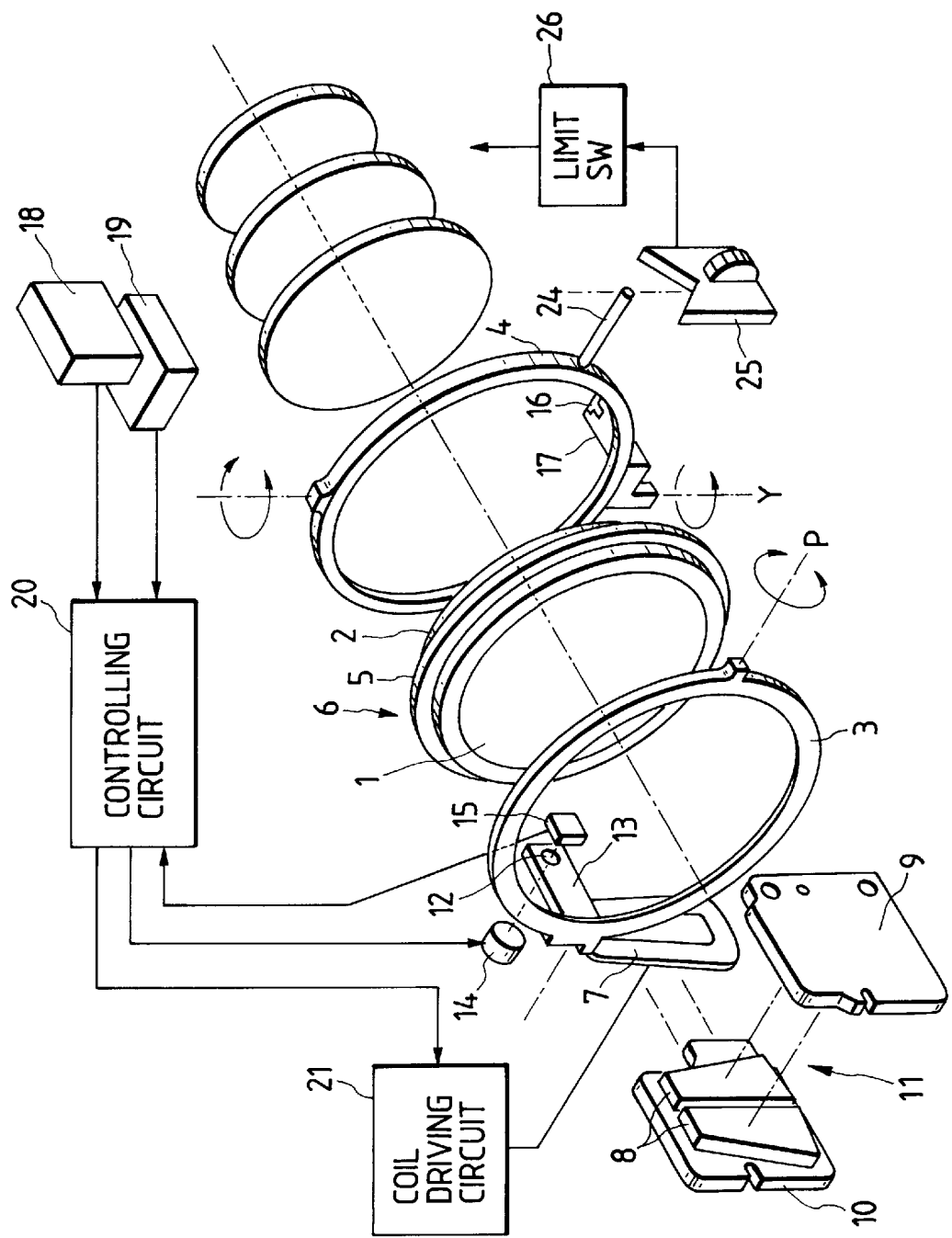
FIG. 11 is an exploded perspective view of an example of the conventional art.

When vibration correction is necessary with the image vibration correcting device mounted on the photo-taking lens 80, when the lock lever 76 is pivotally moved in the direction of arrow f as shown in FIG. 7, the changeover lever 77 is likewise pivotally moved in the direction of arrow f. Thereupon, the changeover pin 68 secured to the lock pin 66 is pushed upwardly and therefore, the lock plate 66 is moved in the direction of arrow d to thereby release the regulation of the lock pins 61a and 62a secured to the frame members 36 and 38. On the other hand, the stopper 73 is pushed out in the direction of arrow c with respect to the lock plate 66 by the push-up spring 74, as shown in FIG. 8, and bears against the lock plate 66 to thereby regulate the movement thereof in the direction of arrow c. Thereby, the driving means for correcting vibration is released.

When vibration occurs to the entire photographing apparatus, the vibration detectors 57 and 58 of the image vibration correcting device output signals proportional to the magnitude of the vibration. These signals are inputted to the control circuit 59, in which they are multiplied by an appropriate multiplier and the magnitude of a vertical angle necessary to eliminate the vibration is calculated. On the other hand, the fluctuation of the angles of rotation of the opposed transparent plates 32 and 33 about the shafts 35 and 37, i.e., the vertical angles of the variable angle prism 31 in the yaw direction and the pitch direction, causes the movement of the spot positions on the light receiving surfaces when the beams of light emitted from the light emitting elements 46 and 55 are transmitted through the slits 44 and 53 formed in the arms 45 and 54 of the frame members 36 and 38 rotated with the opposed transparent plates 32 and 33 and enter the light receiving elements 47 and 56. The light receiving elements 47 and 56 transmit to the control circuit 59 signals conforming to the amounts of movement of the spots, i.e., the magnitude of the vertical angle of the variable angle prism 31.

This control circuit 59 calculates the difference between the magnitude of the aforementioned calculated vertical angle and the magnitude of the vertical angle at the present point of time, and transmits to the coil driving circuit 60 the result of this difference having been multiplied by a predetermined amplification factor as the drive command signal of the coils 39 and 48. This coil driving circuit 60 supplies the coils 39 and 48 with a driving current conforming to the coil drive command signal and generates a coil driving force.

The variable angle prism 31 effects rotative movement about the shafts 35 and 37 by this coil driving force and is deformed so as to coincide with the magnitude of the aforementioned calculated vertical angle. That is, the variable angle prism 31 effects vibration correction by feedback control using the value of the vertical angle calculated so as to correct vibration as a reference signal and using the value of the current vertical angle as a feedback signal.

When the image vibration correcting device is not used while remaining mounted, when the lock lever 76 is pivotally moved in the direction of arrow g as shown in FIG. 6, the changeover lever 77 is likewise pivotally moved in the direction of arrow g, but at this time, the changeover lever 77 pushes the pin 72 secured to the stopper 73 to thereby push the stopper 73 in the direction of arrow c. Thereby, the lock plate 66 has its regulation in the direction of arrow c released and is moved in the direction of arrow c because it is biased in the direction of arrow c by the tension spring 67, and the lock pins 61a and 62a are again regulated by the lock plate 66 and the driving means for correcting vibration is locked.

When a photographer does not lock the driving means for correcting vibration and removes the image vibration correcting device from the photo-taking lens 80 in a moment, the photo-taking lens 80 is removed from the image vibration correcting device in a state shown in FIG. 8 wherein the driving means for correcting vibration is not locked, that is, when the photo-taking lens 80 is moved in the direction of arrow h, the interlocking lever 70 biased by the tension spring 71 as shown in FIG. 3 pivotally moves in the direction of arrow b. Thereby, the stopper 73 supported by the interlocking lever 70 is also pivotally moved in the same direction and therefore, the regulation is released and the lock plate 66 is moved in the direction of arrow c by the tension spring 67. Thus, the lock pins 61a and 62a are regulated by the lock plate 66 and the driving means for correcting vibration is locked. Thus, in the present embodiment, in response to the removal of the stabilizer, the movement thereof is automatically regulated and the stabilizer can be obviated from being damaged by any unexpected shock.

FIGS. 9 and 10 show the construction of a second embodiment of the present invention. In this second embodiment, the interlocking lever 70, the lock lever 76, the changeover lever 77, etc. are eliminated, and a light emitting element 90 and a light receiving element 91 opposed to each other with the fore lens barrel portion 81 of the photo-taking lens 80 interposed therebetween are disposed. Also, the stopper 73 is supported for movement toward and away from the lock plate 66 by a stopper bed 92 having a rack, and a motor 94 having a gear 93 meshing with the rack is provided on the frame 30.

In the image vibration correcting device of such a construction, when the device is removed from the photo-taking lens 80, that is, the photo-taking lens 80 is moved in the direction of arrow h, a beam of light emitted from the light emitting element 90 enters the light receiving element 91, and on the basis of the signal of this light receiving element, a command is set to the motor 94 to thereby move the stopper bed 92, i.e., the stopper 73, in the direction of arrow h through the gear 93, as shown in FIG. 10. Thereby, the regulation of the lock plate 66 in the direction of arrow c is released, the lock plate 66 is moved in the direction of arrow c by the tension spring 67, the lock pins 61 and 62 are regulated by the lock plate 66, and the driving means for correcting vibration is locked.

Also, in the first embodiment, the interlocking lever 70 is interlocked to the fore lens barrel portion 81 of the photo-taking lens 80, but alternatively, it may be interlocked to the operating grip of the photo-taking lens 80.

Description will now be made of a mechanism for mounting and dismounting the image stabilizer with respect to the photo-taking lens. The mechanism of the prism is similar to that shown in FIGS. 1A and 1B and therefore need not be described.

Figure 12:
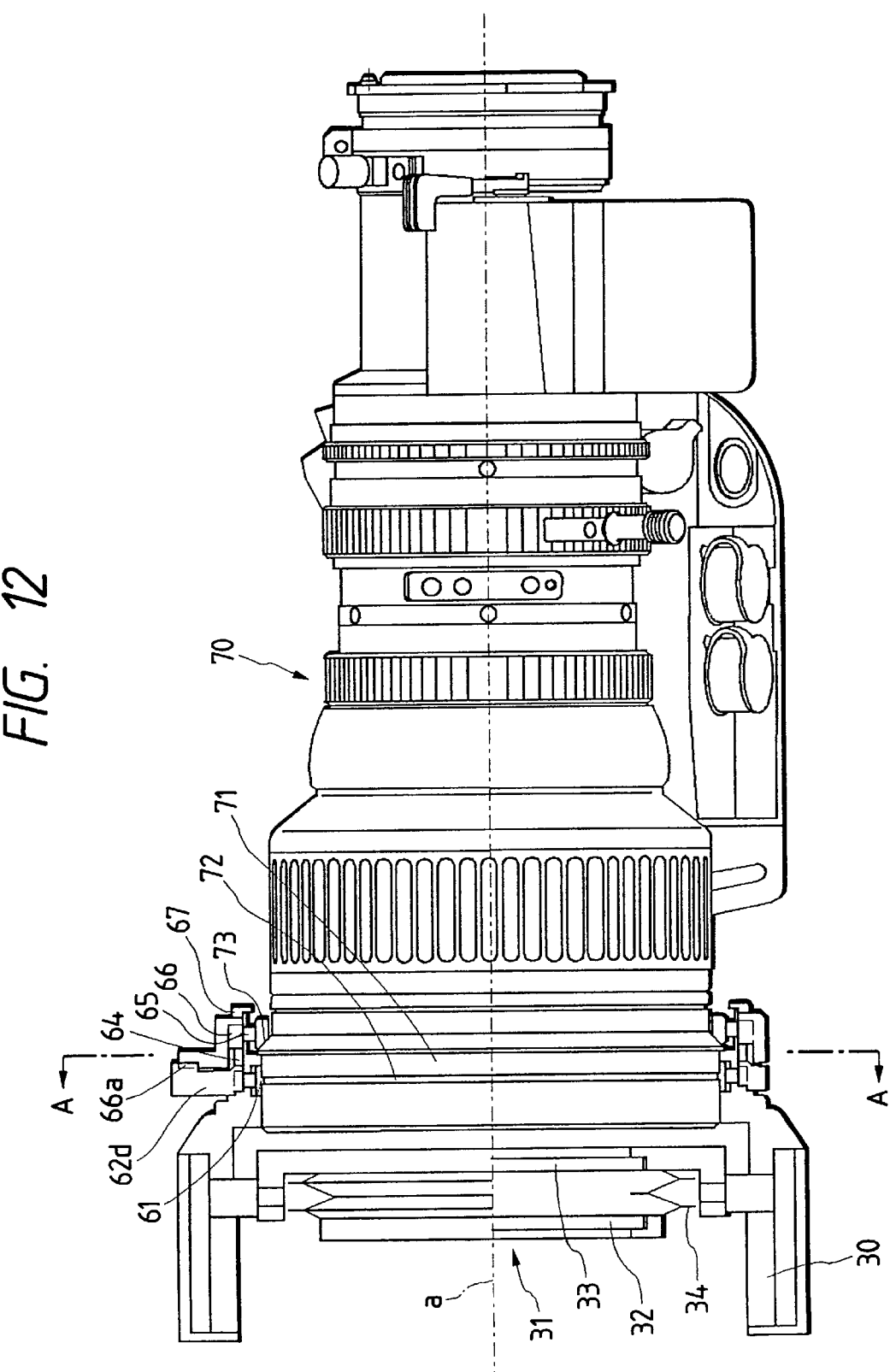
FIG. 12 is a side view of the second embodiment as it is mounted on the photo-taking lens and in which a portion thereof is cut away.
Figure 13:
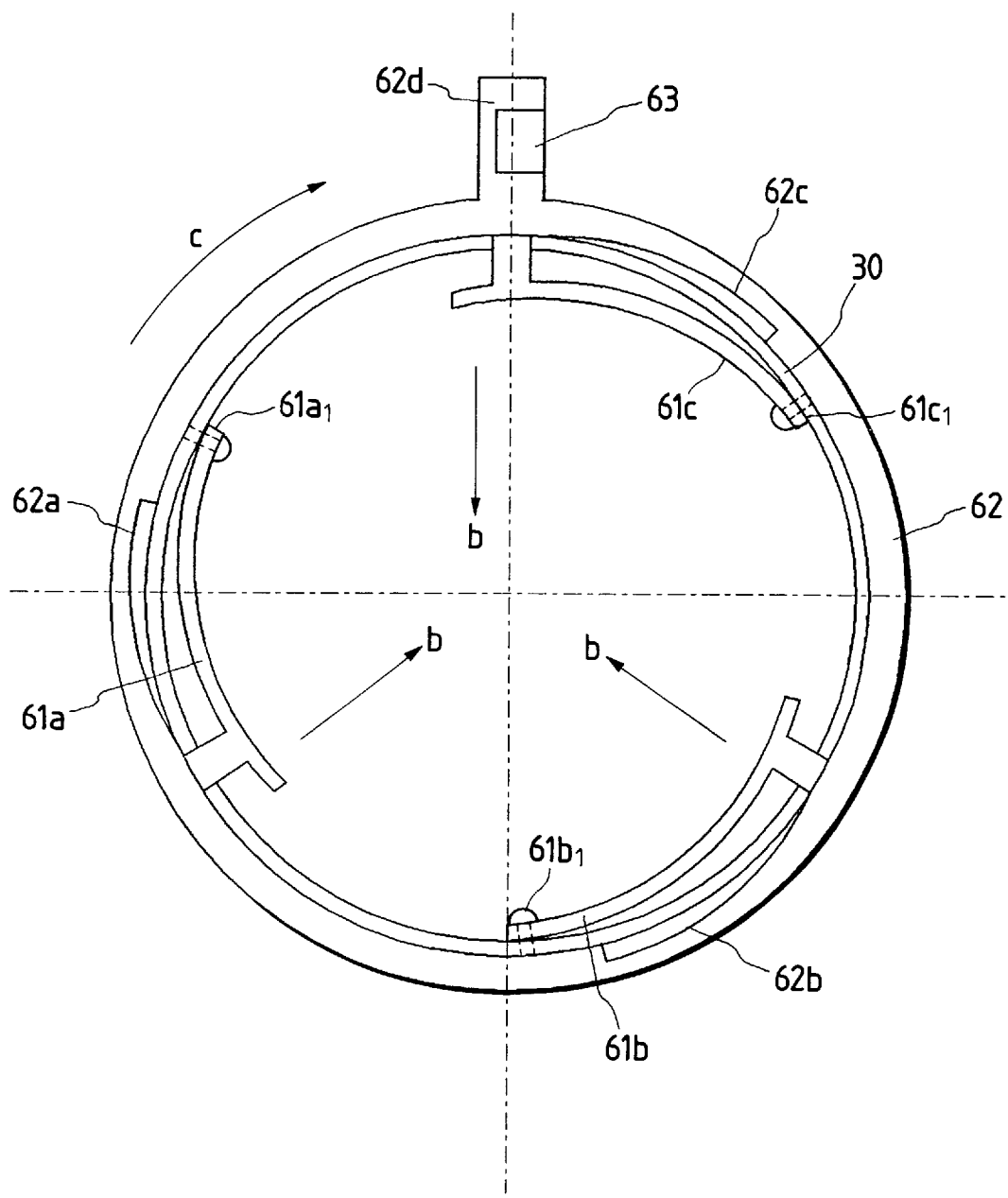
FIG. 13 is a cross-sectional view taken along the line A—A of FIG. 12.

As shown in FIGS. 12 and 13, the frame 30 is mounted in a groove 72 formed in the outer periphery of the fore lens barrel portion 71 of a photo-taking lens 70, by a lock ring 61 secured to the frame 30, the lock ring 61 is formed of a springy material such as phosphor bronze or stainless steel, the ends $61a_1$, $61b_1$ and $61c_1$ thereof are secured to the frame 30 by screws and are disposed at equal intervals along the groove 72 toward the photo-taking lens 70, and the lock ring 61 has three arcuate pieces 61a, 61b and 61c as shown in FIG. 13 which are deformable in the diametral directions b. The frame 30 has apertures at three locations and the other end portions of the arcuate pieces 61a, 61b and 61c are inserted in these apertures so as to slide on the cam surface of a lock cam 62.

Three cut-ins 62a, 62b and 62c corresponding to the arcuate pieces 61a, 61b and 61c and gradually becoming deeper in the direction of arrow c are formed in the inner peripheral surface of the lock cam 62, and the lock cam 62 has an outwardly protruding lever portion 62d, and a recess 63 is formed in that side of this lever portion 62d in the direction of arrow c. On that side of the lock cam 62 which is adjacent to the photo-taking lens 70, a hold-down ring 64 for regulating the movement of the lock cam 62 in the direction of the optical axis is provided on the frame 30.

As shown in FIG. 12, an anti-slippage ring 65 having on its side adjacent to the photo-taking lens 70 a ring formed of a springy material such as phosphor bronze or stainless steel has its other side secured to the frame 30, and an anti-slippage lever 66 having a cam for deforming the anti-slippage ring 65 is provided on the outer periphery of the anti-slippage ring 65, and with the aid of this anti-slippage lever 66, the anti-slippage ring 65 may come into an inclined portion 73 provided on the fore lens barrel portion 71 and becoming smaller in diameter toward the photo-taking lens, from the diametral direction b thereof. Also, the anti-slippage lever 66 is formed with a convex portion 66a adapted to be engaged with a recess 63 in a lever portion 62d only when the lock cam rotates in the direction of arrow c. Further, a hold-down ring 67 having one side thereof secured to the frame 30 and regulating the movement of the anti-slippage ring 65 in the direction of the optical axis a is provided on that side of the anti-slippage ring 65 which is adjacent to the photo-taking lens 70.

In the image vibration correcting device thus constructed, when vibration correction becomes necessary during photographing on a vehicle or on a helicopter, the frame 30 is fitted onto the photo-taking lens 70 and the lock ring 61 is adjusted to the position of the groove 72 in the fore lens barrel portion 71, whereafter the lock cam 62 is rotated in the direction of arrow c. Thereupon, the arcuate pieces 61a, 61b and 61c of the lock ring 61 are pushed by the inclined surfaces of the cut-ins 62a, 62b and 62c of the lock cam 62 and are deformed in the diametral directions b, whereby the lock ring 61 is closely fixed to the groove 72 in the fore lens barrel portion 71. The frame 30 having the lock ring 61 secured thereto is then fixed to the photo-taking lens 70, and the image vibration correcting device is also fixed.

Also, when the lock cam 62 is rotated in the direction of arrow c, the convex portion 66a of the anti-slippage lever 66 comes into engagement with the recess 63 formed in the lever portion 62d of the lock cam 62 and the anti-slippage lever 66 is also moved in the direction of arrow c, but the anti-slippage lever 66, like the lock cam 62, has a cam, by which the anti-slippage ring 65 is deformed so as to come into the inclined portion 73 of the fore lens barrel portion 71 from the diametral direction b.

Thereby, the movement of the frame 30 in the direction of the optical axis is regulated and the falling-off of the image vibration correcting device from the photo-taking lens 70 is prevented. Further, the anti-slippage lever 66 is interlocked with the lock cam 62 in the rotation in the direction of arrow c, but is not interlocked with the lock cam 62 in a direction opposite to the direction of arrow c, i.e., a direction to the release the fixing of the frame 30 to the photo-taking lens 70, because the convex portion 66a comes off the recess 63. Accordingly, even if the photographer releases the lock cam 62 by mistake, the image vibration correcting device will not fall off from the photo-taking lens 70 because the movement of the frame 30 in the direction of the optical axis is regulated by the anti-slippage ring 65.

In the thus mounted image vibration correcting device, the vibration detectors 57 and 58 output signals proportional to the magnitude of vibration when vibration occurs to the entire photographing apparatus. These signals are inputted to the control circuit 59 and are multiplied by an appropriate multiplier, and the magnitude of the vertical angle necessary to eliminate the vibration is calculated. On the other hand, the fluctuation of the angles of rotation of the opposed transparent plates 32 and 33 about the yaw shaft 35, i.e., the vertical angles of the variable angle prism in the pitch direction P and the yaw direction Y causes the movement of the spot positions on the light receiving surfaces when the beams of light emitted from the light emitting elements 46 and 55 are transmitted through the slits 44 and 53 formed in the arms 45 and 54 of the frame members 36 and 38 rotated with the opposed transparent plates 32 and 33 and irradiate the light receiving elements 47 and 56. The light receiving elements 47 and 56 transmit to the control circuit 59 signals conforming to the amounts of movement of spots, i.e., the magnitude of the vertical angle of the variable angle prism 31.

This control circuit 59 calculates the difference between the magnitude of the aforementioned calculated vertical angle and the magnitude of the vertical angle at the present point of time, and transmits to the coil driving circuit 60 the result of this difference having been multiplied by a predetermined amplification factor as the drive command signal of the coils 39 and 48. This coil driving circuit 60 supplied the coils 39 and 48 with a driving current conforming to the coil drive command signal to thereby generate a coil driving force.

The variable angle prism 31 effects rotative movement about the yaw shaft 35 by this coil driving force and is deformed so as to coincide with the magnitude of the aforementioned calculated vertical angle. That is, the variable angle prism 31 effects vibration correction by feedback control using the value of the vertical angle calculated so as to correct vibration as a reference signal and using the value of the current vertical angle as a feedback signal.

Figure 14:
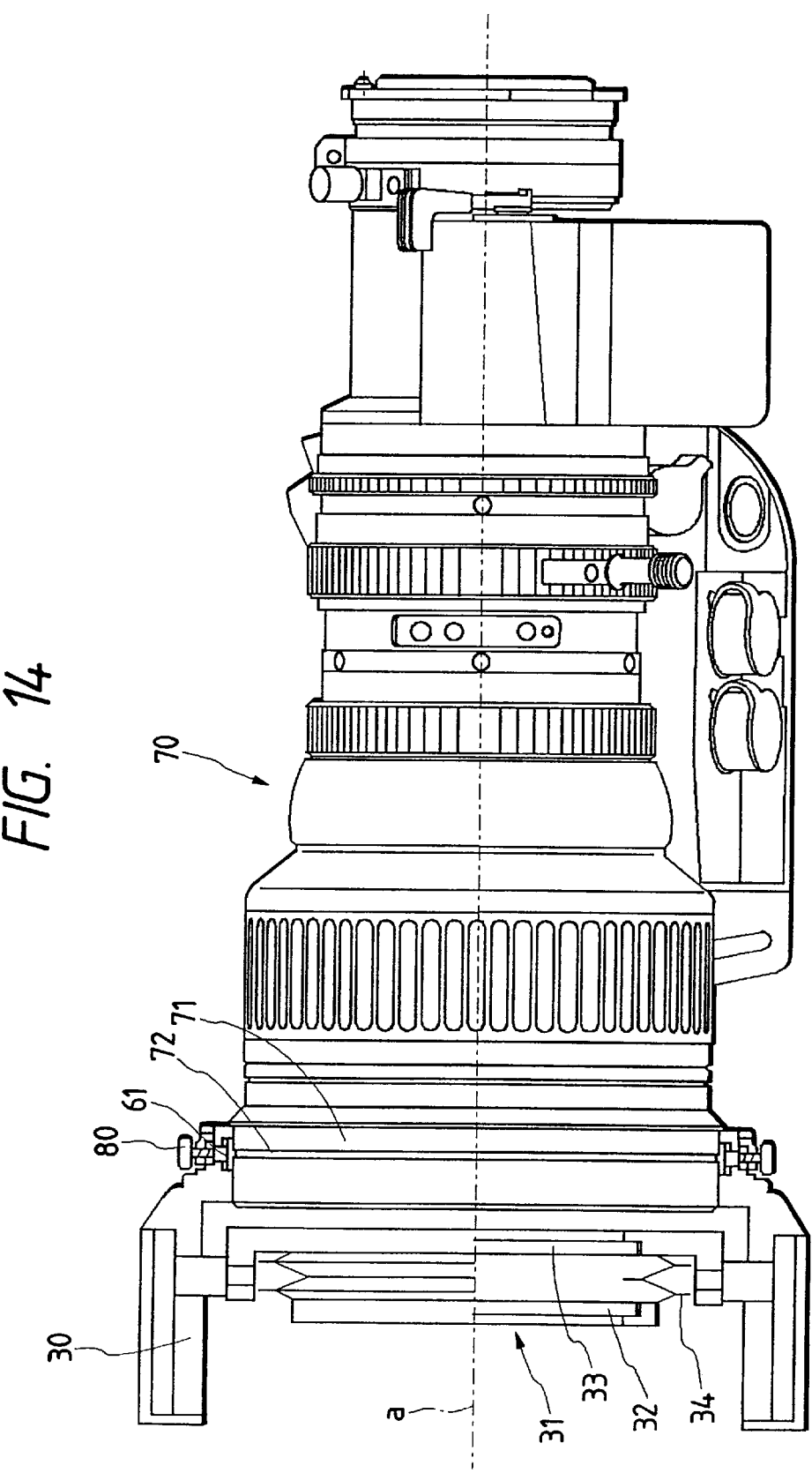
FIG. 14 is a side view of the second embodiment as it is mounted on the photo-taking lens and in which a portion thereof is cut away.

FIG. 14 is a partly cut-away side view of another embodiment of the present invention. In this embodiment, a shaft screw 80 for deforming the lock ring 61 in the diametral direction b, in lieu of the lock cam 62, is provided in the frame 30. Design is made such that after the lock ring 61 is adjusted to the position of the groove 72 in the fore lens barrel portion 71, the shaft screw 80 is fastened, whereupon the lock ring 61 is deformed and eats into the groove 72 in the fore lens barrel portion 71, whereby the frame 30 is fixed.

Figure 15:
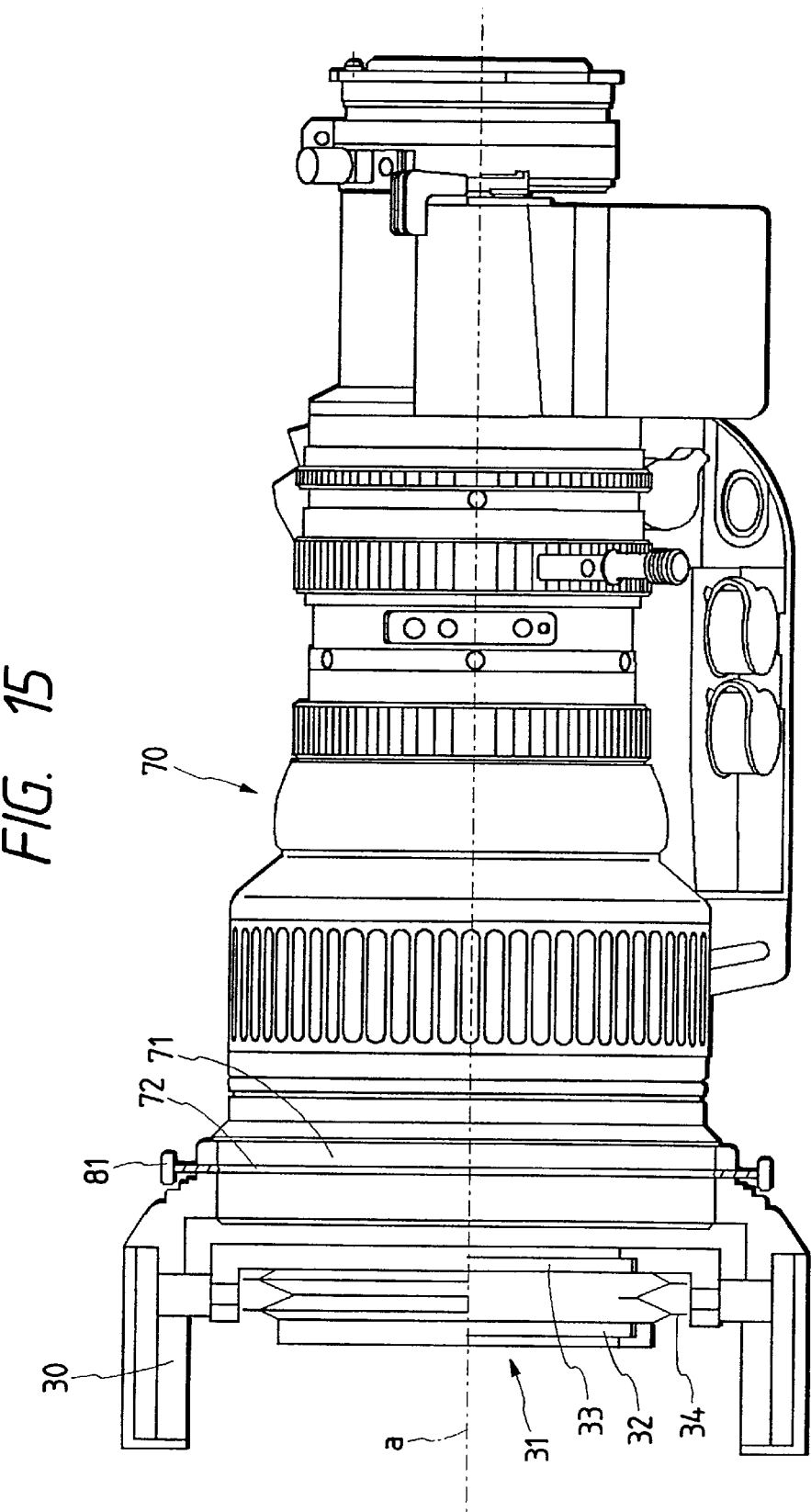
FIG. 15 is a side view of a third embodiment of the present invention as it is mounted on the photo-taking lens and in which a portion thereof is cut away.

FIG. 15 is a partly cut-away side view of still another embodiment of the present invention. In this embodiment, a shaft screw 81 disposed so as to directly eat into the groove 72 in the fore lens barrel portion 71, in lieu of the lock ring 61, is provided in the frame 30. Design is made such that after the lock ring 61 is adjusted to the position of the groove 72 in the fore lens barrel portion 71, the shaft screw 81 is fastened, whereupon the tip end of the shaft screw 81 eats into the groove 72 in the fore lens barrel portion 71, whereby the frame 30 is fixed.

Figure 16:
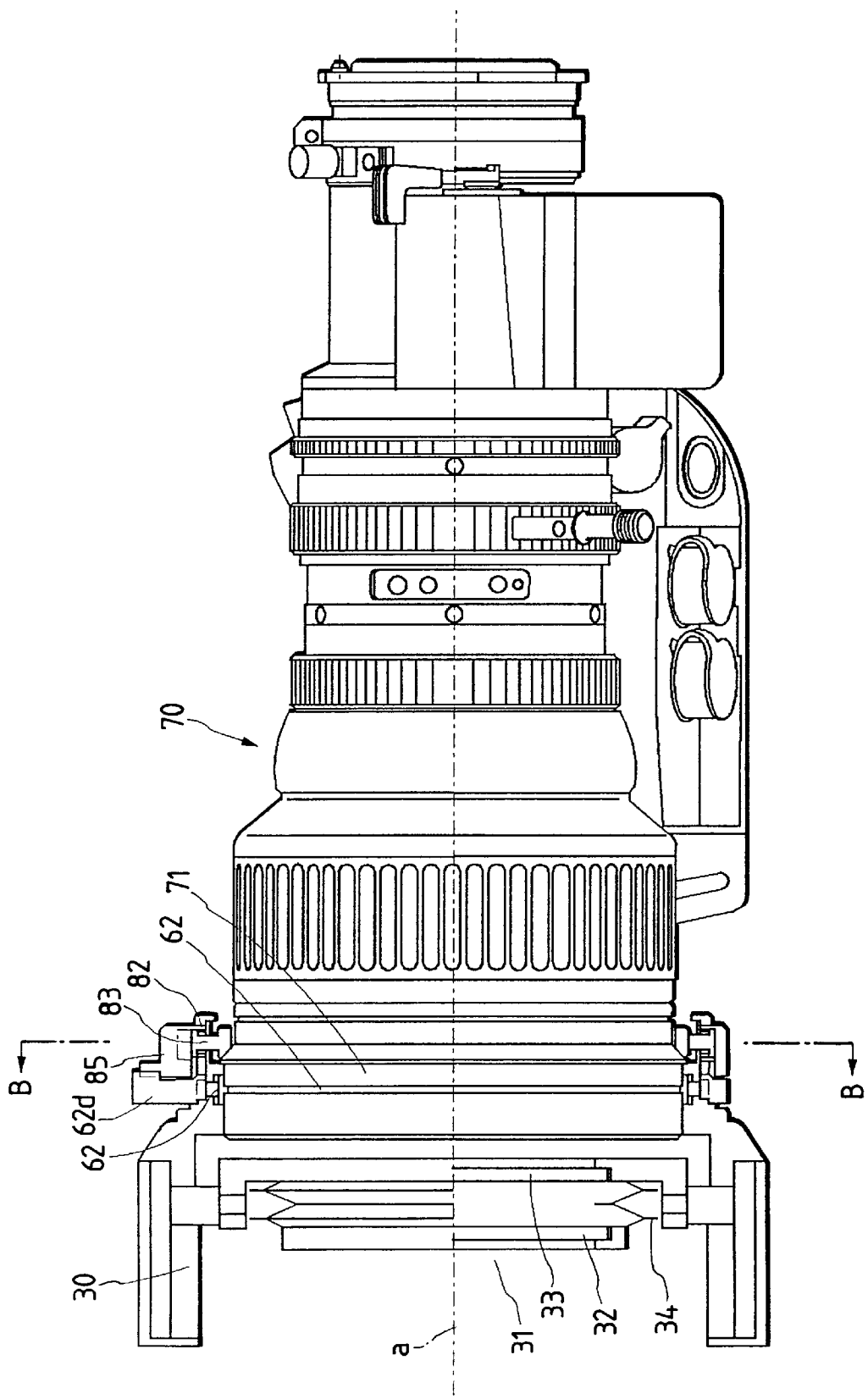
FIG. 16 is a side view of a fourth embodiment of the present invention as it is mounted on the photo-taking lens and in which a portion thereof is cut away.
Figure 17:
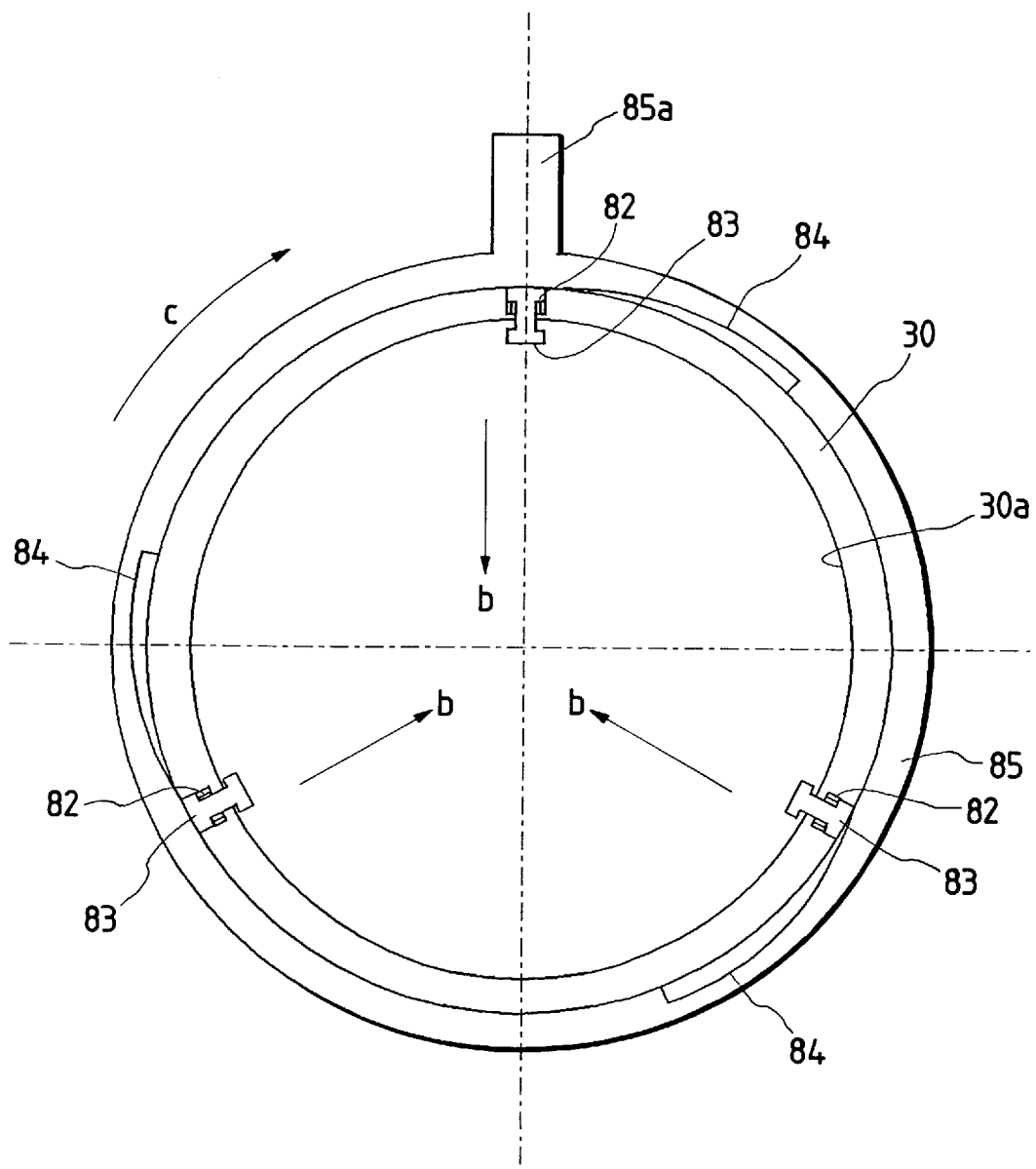
FIG. 17 is a cross-sectional view taken along the line B—B of FIG. 16.

FIG. 16 is a partly cut-away side view of still another embodiment of the present invention. In this embodiment, in lieu of the anti-slippage ring 65 and the anti-slippage lever 66, three anti-slippage members 83 biased in directions opposite to the diametral directions b by springs 82 as shown in FIG. 17 are disposed at equal intervals on the inner peripheral surface of a mounting hole 30a in the frame 30 for mounting with respect to the photo-taking lens 70, and an anti-slippage ring 85 having cams 84 for bearing against the rear ends of the anti-slippage members 83 and regulating the movement thereof in the diametral direction is provided. This anti-slippage ring 85 is formed with a convex portion 85a adapted to be engaged with a recess 63 in a lever portion 62d only when the lock cam 62 is rotated in the direction of arrow c.

After the anti-slippage members 83 are adjusted to the position of the groove 72 in the fore lens barrel portion 71, the lock cam 62 is rotated in the direction of arrow c. Thereupon, the arcuate pieces 61a, 61b and 61c of the lock ring 61 are pushed by the inner surfaces of the cut-ins 62a, 62b and 62c in the lock cam 62 and are deformed in the diametral directions b, whereby the lock ring 61 is closely fixed to the groove 72 in the fore lens barrel portion 71. The frame 30 having the lock ring 61 secured thereto is then fixed to the photo-taking lens 70, and the image vibration correcting device is also fixed.

Also, when the lock ring 61 is rotated in the direction of arrow c, the convex portion 85a rotates the anti-slippage ring 85 with the lever portion 62d of the lock cam 62, and the anti-slippage member 83 are pushed out in the diametral directions b by the cams 84 thereof and come into the inclined portion 73. Thereby, the movement of the frame 30 in the direction of the optical axis a is regulated and the falling-off of the device from the photo-taking lens 70 is prevented.

Further, the anti-slippage ring 85 is interlocked with the lock ring 61 in the rotation in the direction of arrow c, but is not interlocked with the lock ring 61 in a direction opposite to the direction of arrow c, i.e., a direction to the release the fixing of the frame 30 to the photo-taking lens 70. Accordingly, even if the photographer releases the lock ring 61 by mistake, the image vibration correcting device will not fall off from the photo-taking lens 70 because the movement of the frame 30 in the direction of the optical axis a is regulated by the anti-slippage members 83.

What is claimed is:

1. An image stabilizer removably mountable on an objective lens for stabilizing an image formed by the objective lens, comprising:
    a pair of transparent plates enclosing a soft substance therein;
    driving means for tilting said pair of transparent plates; and
    locking means for locking said pair of transparent plates when the image stabilizer is removed from the objective lens.

2. An image stabilizer according to claim 1, wherein said locking means has a lever abutting a lens barrel of the objective lens and regulates movement of said pair of transparent plates in response to movement of said lever.

3. An image stabilizer according to claim 1, wherein each of said pair of transparent plates has an extending portion extending therefrom, and said lacking means regulates movement of said extending portions in response to the removing operation.

4. An image stabilizer according to claim 1, wherein said locking means comprises operation members for locking said pair of transparent plates, said operation members locking said pair of transparent plates even when said image stabilizer is mounted on the objective lens.

* * * * *

UNITED STATES PATENT AND TRADEMARK OFFICE
CERTIFICATE OF CORRECTION

PATENT NO. : 5,859,665

DATED : January 12, 1999

INVENTOR(S) : TETSUSHI HIBI

It is certified that error appears in the above-identified patent and that said Letters Patent is hereby corrected as shown below:

COLUMN 2,
Line 12, "an operator's" should be deleted; and
Line 40, "X and Y" should read --P and Y--.

COLUMN 3,
Line 7, "balkiness" should read --bulkiness--; and
Line 9, "result." should read --results.--.

COLUMN 9,
Line 2, "to the" should read --to--.

COLUMN 10,
Line 35, "to the" should read --to--; and
Line 58, "lacking" should read --locking--.

Signed and Sealed this

Tenth Day of August, 1999

Q. TODD DICKINSON

Attest:

*Attesting Officer*          *Acting Commissioner of Patents and Trademarks*